Aug. 4, 1931.    H. EBERHARD    1,817,181
MEANS FOR DETERMINING ELECTRICAL AXES IN CRYSTALS

Filed June 3, 1927

INVENTOR
HEINRICH EBERHARD
BY *Ira J. Adams*
ATTORNEY

Patented Aug. 4, 1931

1,817,181

UNITED STATES PATENT OFFICE

HEINRICH EBERHARD, OF BERLIN-FRIEDENAU, GERMANY, ASSIGNOR TO RADIO CORPORATION OF AMERICA, A CORPORATION OF DELAWARE

MEANS FOR DETERMINING ELECTRICAL AXES IN CRYSTALS

Application filed June 3, 1927, Serial No. 196,389, and in Germany July 21, 1926.

This invention relates to a crystal and more particularly to a crystal which may be used as a resonator and further this invention also relates to a method for determining the electrical axes in the same.

It is an object of this invention to provide a method for determining the electrical axes of a crystal.

Another object of this invention is to determine such axes by luminous phenomena.

It is a further object of this invention to affect such luminous phenomena by electrical means.

And it is a further object of this invention to affect such luminous phenomena in a portion of a crystal cut from said crystal at an angle to its optical axis.

Other objects as well as advantages of my invention shall be apparent as the description thereof proceeds.

Figure 1:
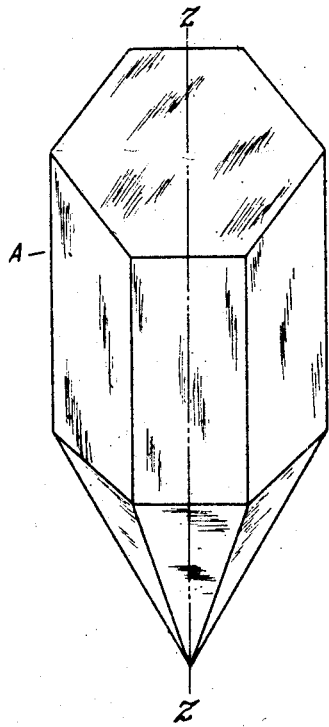
Figure 2:
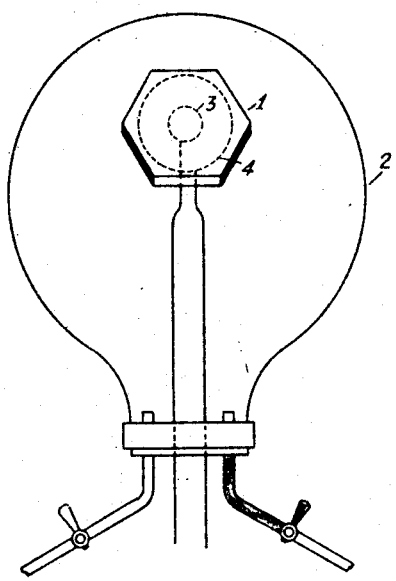

In the accompanying drawings,

Figure 1 is a perspective view of a crystal whose electrical axes are to be determined and, Figure 2 shows a plate cut therefrom arranged to be excited electrically in an evacuated vessel.

In order to locate the electrical axes of a crystal shown, for example, in Figure 1, a plate is cut out of that crystal at right angles to its optical axis Z—Z and it has its electrical axes first determined in the following manner:

The plate 1 is cut out of, for example, a quartz crystal A in such a way that the natural edges of the crystal are preserved. It is then placed within a vessel 2 which is then exhausted and may be, if so desired, filled with a rare-gas mixture. For excitation electrically, two electrodes are provided, one of which, 3 is indicated underneath the quartz plate by a circular disk disposed in the center of said quartz plate. The second electrode, 4, surrounds the interior one in the form of an uninterrupted ring, and is arranged in the vicinity of the circumference of the quartz crystal. The latter electrode may consist of a circularly bent wire ring which is furnished with a supply electrode or lead, and which is sealed in the glass vessel 2. Instead of the disk 3, also a central bore in the quartz plate may be provided in such a way that the inner electrode interfits with the piece of quartz. However, it will be sufficient to merely place the quartz plate upon the concentric anode arrangement as illustrated. Now, if between the two supply electrodes, an alternating field is applied of varying frequency, then, in the presence of a very definite frequency, the quartz plate will become excited when in resonance. The secondary piezo-electric oscillations incidentally become so high that the axes become visible in the gaseous space in the shape of luminescent lines. The axial direction can thus be ascertained and then, after opening the glass vessel, the quartz plate may be cut into smaller pieces along the directions of the axes or may be otherwise worked with reference thereto.

The advantage which the device as hereinbefore described offers resides in the fact that it is only necessary to cut the plates out of the crystals in a direction at right angles to its optical axis Z—Z, (see Figure 1).

It is to be noted that according to this invention, it is possible to excite in resonance any plate cut out of the crystal in a sense perpendicular to the optical axis, without performing any further mechanical work to locate the electrical axial positions. The arrangement not only serves for demonstration and lecture purposes to show visibly the direction of the electrical axes but it also serves the practical purpose of locating or determining suitable directions of cutting or cleaving crystals with relation to the electrical axes, which is of value in the further working of the crystal, for example, in making small crystal resonators.

On the basis of the axial directions thus ascertained, it is feasible to cut perfect single-wave quartz resonators of smaller size, for instance, by cutting out pieces exactly at right angles, or parallel to, the electrical axes determined by the present device. It has been found that the observed poly-wave nature of such quartz resonators is usually ascribable to the fact that the pieces of crystal, for example, quartz, are not orientated with strict exactness in relation to the electrical axes.

Having thus described my invention, what I claim is:

1. In apparatus of the character described, a gas filled container, a pair of concentric electrodes within the container, and a piezo-electric crystal resting on said pair of electrodes.

2. In apparatus of the character described, a container, a single pair of electrodes therein, and a crystal having one of its surfaces in contact with said electrodes, said electrodes being adapted to excite said crystal to vibration at its natural period when an alternating current of proper frequency is impressed upon said electrodes.

3. In apparatus of the character described, a container, a piezo-electric crystal therein and a pair of concentric electrodes facing one surface of said crystal.

4. In combination, a crystal and a single pair of electrodes for exciting the same, said electrodes being disposed on solely one side of said crystal, and said electrodes being adapted to excite said crystal to vibration at its natural period when an alternating current of proper frequency is impressed on said electrodes.

5. In combination, a crystal and a pair of electrodes for supporting and exciting said crystal, said electrodes contacting with said crystal on concentric areas on one surface of crystal.

HEINRICH EBERHARD.